April 22, 1969 T. N. CHRISTIANSEN 3,439,721

MACHINE FOR CUTTING BAIT FISH

Filed Nov. 1, 1966

INVENTOR:
Thorbjørn N. Christiansen
BY Kurt Kelman
AGENT 3,439,721
MACHINE FOR CUTTING BAIT FISH
Thorbjorn N. Christiansen, Nyksund, Norway
Continuation-in-part of application Ser. No. 579,294, Sept. 14, 1966. This application Nov. 1, 1966, Ser. No. 591,268
Claims priority, application Norway, Sept. 14, 1965, 159,691/65
Int. Cl. A01d 55/24, 55/18
U.S. Cl. 146—99                                8 Claims

ABSTRACT OF THE DISCLOSURE

A bait fish cutting machine has a casing mounting two shafts for rotation about axes converging at 30° to 45°, the axes being obliquely inclined to a normally horizontal top of the casing and converging in an obliquely upward direction. The shafts are driven simultaneously in opposite directions, and a plurality of cutting blades are mounted on each shaft to define interstices therebetween, with the blades of each shaft projecting into the interstices between the blades on the other shaft.

---

This application is a continuation-in-part of application Ser. No. 579,294, filed Sept. 14, 1966, now abandoned.

This invention relates to chopping machines, and particularly to a machine for cutting herring, mackerel, and similar bait fish into pieces suitable for line bait.

It is common practice in commercial line fishing that one man in each boat is employed full time cutting bait fish into pieces of suitable size. The bait fish must be cut obliquely relative to their longitudinal axis, and the work requires reasonable care and a corresponding amount of time.

The object of the invention is the provision of a machine which cuts bait fish in the desired manner as fast as the fish can be fed to the machine.

With this object and others in view, as will hereinafter become apparent, the invention in its more specific aspects provides a casing having a normally horizontally extending top portion with two shafts whose axes are obliquely downwardly inclined relative to the casing top and converge in an upward direction at an angle of approximately 30 to 45 degrees. The shafts are simultaneously driven in opposite directions by a motor and carry axially spaced cutting blades arranged in such a manner that each blade on one shaft projects into the interstices between the blades on the other shaft.

Bait fish is fed to the rotating blades from above through a feed chute, and the cut pieces are discharged from the machine through a discharge chute which may be partitioned so as separately to collect the heads and tails of the bait fish from the axial ends of each rotating blade assembly. The two chutes are at least approximately aligned with a vertical plane which bisects the angle between the shaft axes.

Figure 1:
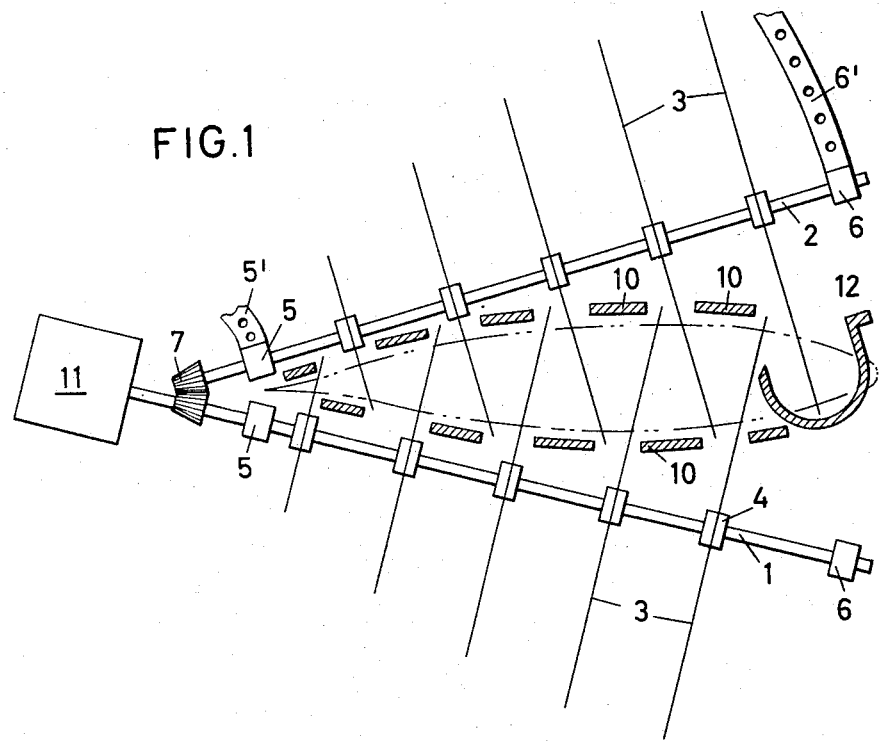
Figure 2:
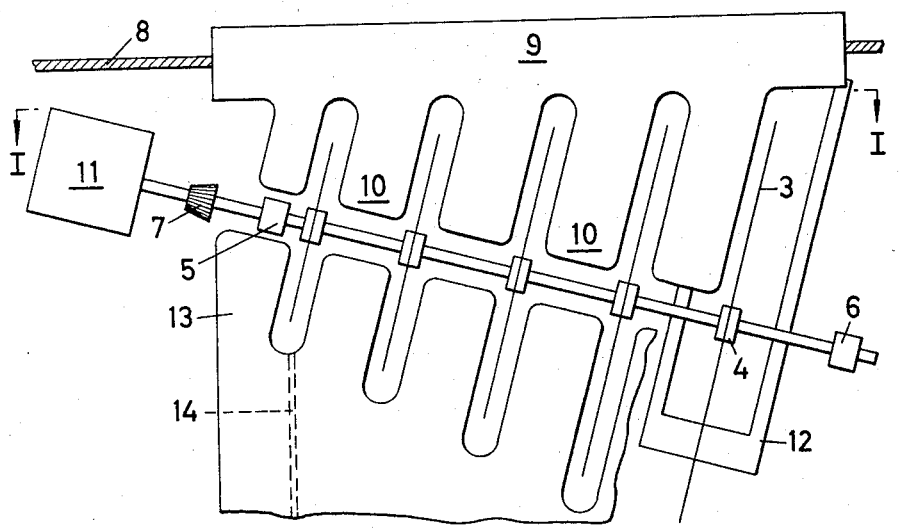

Other features and many of the attendant advantages of this invention will be readily appreciated as the same becomes better understood by reference to the following detailed description of a preferred embodiment when considered in connection with the accompanying drawings in which:

FIG. 1 shows a bait cutting machine of the invention in fragmentary sectional plan view; and
FIG. 2 shows the machine of FIG. 1 in elevational plan view.

Referring now to the drawing in detail, there is seen a casing 8 of which only the top plate has been shown. An electric motor 11 and bearings 5 and 6 are mounted in the casing to support a shaft 1 which is directly driven by the motor 11. The shaft 1 slopes obliquely downward from the casing top, and the higher axial end portion of the shaft between the motor 11 and the bearing 5 carries a bevel gear 7. It meshes with another bevel gear 7 on the end of another shaft 2 whose bearings 5 and 6 are mounted on brackets 5', 6' fastened to the casing 8 in a non-illustrated manner so as to permit adjustment of the angle between the axes of the shafts 1, 2 between the illustrated value of approximately 30° to about 45°. The shaft 2 slopes obliquely downward from the associated bevel gear 7 and bearing 5 to the bearing 6 in a common plane with the shaft 1.

Five circular cutter blades 3 are mounted on each shaft 1, 2 in axially spaced relationship by means of collars 4 which are axially slidable on the shafts 1, 2 and are held in desired adjusted positions by non-illustrated set screws in a conventional manner. The blades 3 increase in diameter in the direction in which the shafts 1, 2 diverge and are arranged in such a manner that the blades 3 on each shaft project into the interstices which axially separate the blades on the other shaft.

An opening in the top of the casing 8 accommodates a feed chute 9 whose top opening is thus accessible from the outside, and which opens downwardly toward the blades 3. Finger-like extensions 10 of the chute 9 receive the blades 3 therebetween. As is best seen in FIG. 1, one blade 3 from each shaft 1, 2 is received in the gap between each pair of adjacent extensions 10.

A discharge chute 13 similar to the feed chute, but of inverted shape, is arranged under the blades 3 to receive the cut pieces of bait fish. A partition 14 in the chute 13 is aligned with the blades 3 nearest the motor 11 to discharge the tail ends of the bait fish separately from the main portion of the body. A similar partition is provided near the largest blades 3 for separately discharging the heads, but this partition has been broken away in FIG. 2 together with the corresponding portion of the discharge chute 13 in order to show an auxiliary guide chute 12 inserted into the feeding chute 9. The guide chute 12 is dimensioned to accept a bait fish head first and to guide it against the largest blade on the shaft 2 in such a manner that the fish is longitudinally split by the blade.

The cross section of the feed chute 9 in a horizontal plane corresponds approximately to the shape and size of the bait fish to be cut, as viewed from the side, and the machine may be adjusted to use with bait fish of different size and shape by replacing the chute 9 with another one of different size and contour, and by changing the angle between the shafts 1, 2. The size of the bait pieces obtained may be varied by shifting the blades 3 axially on the shafts 1, 2, and by slicing or not slicing the bait fish lengthwise.

The shape and size of the bait pieces discharged from the chute 13 may be further varied to some extent by dropping a fish on the blades 3 with its longitudinal axis horizontal or obliquely inclined relative to a horizontal plane.

Obviously, many modifications and variations of the present invention are possible in the light of the above teachings. It is therefore to be understood that, within the scope of the appended claims, the invention may be practiced otherwise than as specifically described.

What is claimed is:
1. A bait fish cutting machine comprising, in combination:
 (a) a casing;
 (b) two shafts mounted in said casing for rotation about respective axes converging at an angle of approximately 30 to 45 degrees,

(1) said casing having a normally horizontal top, said axes being obliquely inclined relative to said top, and converging in an obliquely upward direction;
(c) a plurality of cutting blades mounted on each shaft in axially spaced relationship so as to define interstices therebetween, the blades on each shaft projecting into the interstices between the blades on the other shaft; and
(d) drive means for simultaneously rotating said shafts in opposite directions.

2. A machine as set forth in claim 1, wherein said drive means include a plurality of meshingly engaged gear means respectively secured to said shafts for joint rotation therewith.

3. A machine as set forth in claim 1, further comprising fastening means releasably securing said blades to the respective shaft in axially adjustable positions.

4. A bait fish cutting machine comprising, in combination:
(a) a casing;
(b) two shafts mounted in said casing for rotation about respective axes converging at an angle of approximately 30 to 45 degrees;
(c) a plurality of cutting blades mounted on each shaft in axially spaced relationship so as to define interstices therebetween, the blades on each shaft projecting into the interstices between the blades on the other shaft;
(d) drive means for simultaneously rotating said shafts in opposite directions;
(e) a bearing supporting one of said shafts; and
(f) fastening means releasably securing said bearing to said casing for varying said angle of said axes.

5. A bait fish cutting machine comprising, in combination:
(a) a casing;
(b) two shafts mounted in said casing for rotation about respective axes converging at an angle of approximately 30 to 45 degrees;
(c) a plurality of cutting blades mounted on each shaft in axially spaced relationship so as to define interstices therebetween, the blades on each shaft projecting into the interstices between the blades on the other shaft;
(d) drive means for simultaneously rotating said shafts in opposite directions;
(e) feed chute means having an upwardly open end accessible from outside said casing, and a downwardly open end adjacent said blades; and
(f) discharge chute means leading outward of said casing from said blades in a downward direction.

6. A machine as set forth in claim 5, wherein said discharge chute means include partition means dividing a portion of said chute means adjacent respective axial end portions of said shafts from the remainder of said discharge chute means, said feed chute means being substantially aligned with a vertical plane bisecting said angle.

7. A machine as set forth in claim 6, wherein said casing has a normally horizontally extending top portion formed with an opening therein, said feed chute means being mounted in said opening and having a plurality of downwardly extending finger portions interposed between the blades on each of said shafts.

8. A machine as set forth in claim 7, wherein said feed chute means include guide means for guiding a fish head first downward against one of said blades for lengthwise splitting of said fish by said one blade.

References Cited
UNITED STATES PATENTS

| | | | |
|---|---|---|---|
| 165,910 | 7/1875 | Young | 143—38 |
| 250,869 | 12/1881 | Arave | 146—99 X |
| 482,697 | 9/1892 | Rodgers | 143—37 |

JAMES M. MEISTER, *Primary Examiner.*

U.S. Cl. X.R.

083—591; 146—127